United States Patent Office 3,161,685
Patented Dec. 15, 1964

---

3,161,685
PROCESS FOR THE PREPARATION OF HALOGENATED KETONES
Francesco Minisci, Milan, Italy, assignor to Montecatini Società Generale per l'Industria Mineraria e Chimica, Milan, Italy
No Drawing. Filed Jan. 11, 1960, Ser. No. 1,410
Claims priority, application Italy Jan. 12, 1959
10 Claims. (Cl. 260—593)

This invention is directed to a process of making epsilon-halogen-substituted ketones from 1-substituted cycloaliphatic hydroperoxides, and to the compounds prepared thereby.

This application is a continuation-in-part of my prior applications Serial No. 734,448, filed May 12, 1958, and subsequently allowed to abandon, and Serial No. 788,491, filed January 23, 1959, now U.S. Patent No. 3,026,334, which describe the preparation of epsilon-substituted derivatives of caproic acid, by reacting, for example, cyclohexanone peroxide with a hydrogen halide, or other hydracid, or with an alkaline halide, cyanide, sulphocyanide, thiosulphate, azohydrate, or with sulphur dioxide, in the presence of redox type substances, in particular heavy metal salts in their lowest valency form.

The object of the present invention is an improvement in such processes, namely to prepare, in a very economic and simple way, halogenated ketones starting from easily available substances.

The process comprises decomposing, in the presence of hydrohalic acids or of alkaline halides, hydroperoxides having the following structure:

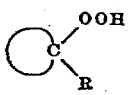

where R is an alkyl, aryl or cycloalkyl residue.

As decomposition agents, substances capable of bringing about the radicalic decomposition of the hydroperoxidic function are used, such as ferrous and cuprous salts. From the cyclohexanone derivatives, the following ketones are obtained:

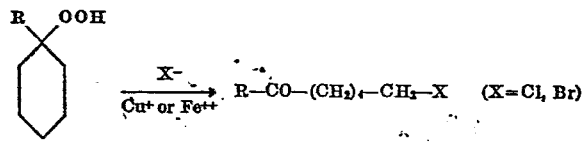

From cyclopentane derivatives:

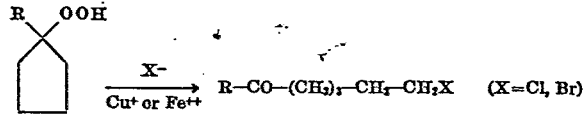

The process according to the present invention consists in reacting the above mentioned peroxides with halohydric acids or with alkaline halides, at temperatures ranging between —20 and +50° C., preferably between —10 and +10° C., in the presence of typical substances of redox systems suitable for causing the radicalic decomposition of peroxides, in particular heavy-metal salts having a variable valency, employed in the lowest valency form.

The reaction can be carried out in a homogeneous phase, using a suitable solvent, essentially methanol or ethanol, for both the peroxide and the decomposition agents. Or it can be operated in two phases, one of which consists of the water solution of the decomposition agent and the other one of the peroxide or of a solution thereof in an organic solvent, such as ether, aliphatic, aromatic or cycloaliphatic hydrocarbons, chloroform, etc.

Some of these halogenated ketones have been prepared, according to recent patents, by starting with alicyclic hypochlorites. Among such are the U.S. Patents 2,675,402 of April 13, 1954, and 2,691,682 of October 12, 1954, to B. E. Englund, which disclose the preparation of omega-halogenated ketones from tertiary cycloaliphatic hypohalites. These omega-halogenated ketones are stated in these patents to be useful as otherwise difficulty obtainable intermediates for organic synthesis, and as compounds of biological interest for their pesticidal and fungicidal properties. Thus from 1-methyl-cyclopentyl-hypochlorite, 6-chloro-hexanone-(2) is obtained:

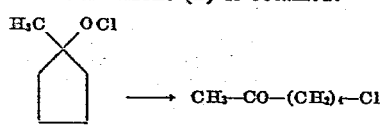

The process of the present invention offers the great advantage of starting with alicyclic hydrocarbons, which are products of low cost and by far more easily accessible than the tertiary alicyclic alcohols needed to prepare the corresponding hypochlorites. In order to illustrate the present invention, some examples are hereunder given which, however, do not limit the protection field claimed.

*Example No. 1*

11 gr. of 1-methylcyclohexylhydroperoxide diluted in 50 cm.$^3$ of methylcyclohexane are added, stirring continuously under at atmosphere of nitrogen, to a solution of 16 gr. of heptahydrate ferrous sulphate, 8 cm.$^3$ of 35% hydrochloric acid and 450 cm.$^3$ of water. Temperature —5 to 0° C. When addition is completed the organic layer is decanted and fractionally distilled.

8.2 gr. of 7-chloro-heptanone-(2) are obtained at 101–2° C. at 16 mm.

*Example No. 2*

11 gr. of 1-methylcyclohexylhydroperoxide are added, with continuous stirring to a solution containing 6 gr. of cuprous chloride, 8 cm.$^3$ of 36% hydrochloric acid and 30 cm.$^3$ of water. Temperature 5–10° C. When the mixing is completed, the mixture is extracted with ether. The solvent is then removed and the residue yields 7.9 gr. of 7-chloro-heptanone-(2) by distillation carried out at reduced pressure.

*Example No. 3*

4.75 gr. of 1-methylcyclohexylhydroperoxide diluted in 30 cm.$^3$ of methylcyclohexanone are added, with continuous stirring, to a solution containing 10 gr. of ferrous sulphate, 10 cm.$^3$ of 40% hydrobromic acid and 30 cm.$^3$ of water. Temperature —2 to 0° C. The organic layer is then decanted and fractionally distilled; 4.3 gr. of 7-bromo-heptanone-(2) are obtained at 118–9° C. at 17 mm.

*Example No. 4*

The operation is carried out as in Example No. 3, but using 4 gr. of cuprous chloride instead of ferrous sulphate. 4.4 gr. of 7-bromo-heptanone-(2) are obtained.

*Example No. 5*

12 gr. of 1-methylcyclophentylhydroperoxide diluted in 46 cm.$^3$ of methylcyclopentane are added, with continuous stirring, to a solution containing 18 gr. of ferrous heptahydrate sulphate, 10 cm.$^3$ of 36% hydrochloric acid and 60 cm.$^3$ of water. Temperature —4 to 0° C. After decanting the organic layer it is fractionally distilled; 7.8 gr. of 6-chloro-hexanone-(2) are obtained which distills a 82–83° C. at 15 mm.

*Example No. 6*

9.4 gr. of 1-methylcyclopentylhydroperoxide diluted in 20 cm.³ of petroleum ether are added, stirring continuously, to a solution containing 15 gr. of ferrous heptahydrate sulphate, 15 cm.³ of 40% hydrobromic acid and 40 cm.³ of water, at a temperature of 6–8° C. The ether layer is decanted and, after removing the solvent, the remainder is fractionally distilled. 6.8 gr. of 6-bromo-hexanone-(2) are thus obtained at 135–137° C. at 90 mm.

Operating with 6 gr. of cuprous chloride instead of ferrous sulphate, 6.6 gr. of 6-bromo-hexanone-(2) are obtained.

As shown by the general formulas and reaction scheme presented in the introductory part of the specification, the 1-methyl group of the hydroperoxide intermediate employed in the above six examples can be replaced by other alkyl groups, such as ethyl, propyl, the various butyl groups, and higher alkyl groups. The 1-methyl group in said examples can also be replaced by aryl groups, such as phenyl and alkyl-substituted phenyl, and by cycloalkyl groups, such as cyclohexyl and cyclopentyl. The cycloaliphatic radical of the hydroperoxide can have such additional substituents in the 2,3- and other positions.

I claim:

1. A process for the preparation of halogenated ketones of the general formula R—CO—(CH$_2$)$_n$—CH$_2$X, where R is a hydrocarbon radical taken from the group consisting of lower alkyl, phenyl, lower-alkyl-phenyl, cyclohexyl, and cyclopentyl groups, X is taken from the group consisting of chlorine and bromine and $n$ is a whole number from 3 to 4 characterized in that a cycloaliphatic hydroperoxide of the formula

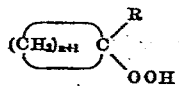

where R has the above meaning, is treated with an agent of the group consisting of hydrochloric acid, hydrobromic aicd, and their respective alkaline salts, in the presence of water and a redox reducing agent, at temperatures ranging between —20 and +50° C., said reducing agent comprising a salt of a polyvalent heavy metal of the group consisting of iron and copper, in the lowest valency form.

2. The process of claim 1, in which the redox reducing agent is ferrous sulphate.

3. The process of claim 1, in which the redox reducing agent is cuprous chloride.

4. The process of claim 1, the said peroxide being diluted with the corresponding 1-substituted cycloaliphatic cycloketone.

5. The process of claim 1, the said peroxide being previously dissolved in an organic solvent therefor, taken from the group consisting of ether, chloroform, alkylcyclohexanone, alkylcyclopentane, and arylcyclohexanone.

6. The process of claim 1, the reaction being in homogeneous phase carried out in an organic solvent for both the peroxide and said agent.

7. A process of making 7-chloro-heptanone-2 comprising reacting 1-methylcyclohexylhydroperoxide with aqueous hydrochloric acid and a redox reducing agent comprising a salt of a polyvalent heavy metal of the group consisting of iron and copper, in the lowest valency form, at a temperature of —20 to +50° C.

8. A process of making 7-bromo-heptanone-2 comprising reacting 1-methylcyclohexylhydroperoxide with aqueous hydrogen bromide and a redox reducing agent comprising a salt of a polyvalent heavy metal of the group consisting of iron and copper, in the lowest valency form, at a temperature of —20 to +50° C.

9. A process of making 6-chloro-hexanone-2, comprising reacting 1-methylcyclopentylhydroperoxide with aqueout hydrochloric acid and a redox reducing agent comprising a salt of a polyvalent heavy metal of the group consisting of iron and copper, in the lowest valency form, at a temperature of —20 to +50° C.

10. A process of making 6-bromo-hexanone-2, comprising reacting 1-methylcyclopentylhydroperoxide with aqueous hydrobromic acid and a redox reducing agent comprising a salt of a polyvalent heavy metal of the group consisting of iron and copper, in the lowest valency form, at a temperature of —20 to +50° C.

References Cited in the file of this patent

UNITED STATES PATENTS

| | | |
|---|---|---|
| 2,700,057 | Punderson | Jan. 18, 1955 |
| 2,905,712 | Braunwarth et al. | Sept. 22, 1959 |
| 2,938,918 | Lavigne | May 31, 1960 |
| 2,967,197 | Crosby et al. | Jan. 3, 1961 |

OTHER REFERENCES

Sidgwick: Chemical Elements and Their Compounds, vol. II, pp. 1139 and 1143 (1950).